(12) United States Patent
Takahashi (10) Patent No.: US 7,423,843 B2
(45) Date of Patent: Sep. 9, 2008

(54) IN-CONTACT MAGNETIC HEAD SLIDER WITH MULTIPLE SURFACE LEVELS FOR CREATING MULTIPLE POSITIVE AND NEGATIVE PRESSURE REGIONS

(75) Inventor: Kan Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 340 days.

(21) Appl. No.: 10/934,146

(22) Filed: Sep. 2, 2004

(65) Prior Publication Data
US 2005/0047018 A1    Mar. 3, 2005

(30) Foreign Application Priority Data
Sep. 2, 2003    (JP)    ............................. 2003-310274

(51) Int. Cl.
G11B 5/60    (2006.01)
G11B 17/32    (2006.01)

(52) U.S. Cl. ................................. 360/235.6; 360/236.3

(58) Field of Classification Search .............. 360/236.6, 360/235.5, 235.4, 235.8, 235.9, 236, 235.6, 360/235.7, 236.1, 236.3
See application file for complete search history.

(56) References Cited

U.S. PATENT DOCUMENTS

| | | | | |
|---|---|---|---|---|
| 5,532,890 A | * | 7/1996 | Dorius et al. ............ | 360/236.3 |
| 5,754,367 A | | 5/1998 | Chang et al. | |
| 6,069,770 A | * | 5/2000 | Cui et al. .................... | 510/175 |
| 6,072,662 A | * | 6/2000 | Utsunomiya ............. | 360/236.1 |
| 6,137,656 A | * | 10/2000 | Levi et al. ................. | 360/235.4 |
| 6,144,528 A | * | 11/2000 | Anaya-Dufresne et al. ........................ | 360/235.4 |
| 6,212,032 B1 | * | 4/2001 | Park et al. ................. | 360/234.7 |
| 6,356,412 B1 | | 3/2002 | Levi et al. | |
| 6,445,542 B1 | * | 9/2002 | Levi et al. ................. | 360/236.5 |
| 6,459,546 B1 | | 10/2002 | Mundt et al. | |
| 6,477,012 B1 | * | 11/2002 | Park et al. ................. | 360/236.1 |
| 6,529,346 B2 | * | 3/2003 | Otsuka ..................... | 360/235.8 |
| 6,583,961 B2 | | 6/2003 | Levi et al. | |
| 6,707,631 B1 | * | 3/2004 | Haddock ...................... | 360/75 |
| 6,731,464 B2 | * | 5/2004 | Sasaki et al. ............. | 360/236.3 |
| 7,100,269 B2 | * | 9/2006 | Sasaki et al. ............... | 29/603.2 |
| 7,123,449 B2 | * | 10/2006 | Kang ...................... | 360/235.8 |
| 2001/0010613 A1 | | 8/2001 | Otsuka | |
| 2002/0034048 A1 | * | 3/2002 | Nakano ..................... | 360/236 |

(Continued)

FOREIGN PATENT DOCUMENTS

EP    1 271 481 A2    1/2003

(Continued)

*Primary Examiner*—Brian E. Miller
*Assistant Examiner*—Matthew G Kayrish
(74) *Attorney, Agent, or Firm*—Foley & Lardner LLP (57) ABSTRACT

A magnetic head structure is formed on an air-bearing surface thereof including first, second and third surfaces located in order in a height direction from a level closest to the magnetic recording medium so as to form negative and positive pressure-generating regions. The structure includes a first positive pressure-generating region having the second and first surfaces formed at a central portion along a longitudinal direction thereof, a first negative pressure-generating region having the third surface formed on a side of an air inlet edge with respect to the first positive pressure-generating region and a second negative pressure-generating region having the third surface formed on a side of an air outlet edge with respect to the first positive pressure-generating region.

15 Claims, 9 Drawing Sheets

U.S. PATENT DOCUMENTS

| | | |
|---|---|---|
| 2002/0191341 A1 | 12/2002 | Kohira et al. |
| 2003/0095360 A1 | 5/2003 | Sasaki et al. |
| 2003/0103293 A1 | 6/2003 | Nakano et al. |

FOREIGN PATENT DOCUMENTS

| | | |
|---|---|---|
| EP | 1 315 151 A2 | 5/2003 |
| JP | 61-50601 | 3/1986 |
| JP | 7-307069 | 11/1995 |
| JP | 2001-126429 A | 5/2001 |
| JP | 2001-283549 A | 10/2001 |
| JP | 2002-92836 | 3/2002 |
| JP | 2003-99910 A | 4/2003 |
| JP | 2003-173644 A | 6/2003 |

* cited by examiner

IN-CONTACT MAGNETIC HEAD SLIDER WITH MULTIPLE SURFACE LEVELS FOR CREATING MULTIPLE POSITIVE AND NEGATIVE PRESSURE REGIONS

CROSS-REFERENCE TO RELATED APPLICATIONS

This application is based upon and claims the benefit of priority from prior Japanese Patent Application No. 2003-310274, filed Sep. 2, 2003, the entire contents of which are incorporated herein by reference.

BACKGROUND OF THE INVENTION

1. Field of the Invention

The present invention relates to an in-contact magnetic head slider configured to perform recording data to and reading data from a magnetic recording medium, a magnetic head assembly having the magnetic head slider, and a magnetic recording apparatus having the magnetic head assembly.

2. Description of the Related Art

In magnetic recording apparatuses (hard disc drives), increase in recording density is constantly required, and various techniques have been developed for this purpose. One example of such techniques is an in-contact magnetic head slider. For the in-contact magnetic head slider, recording and reading are performed while an end of the slider in the disc traveling direction is kept in contact with the magnetic disc by applying an air layer pressure to the air-bearing surface (slider surface) of the slider. According to this slider contact scheme, the magnetic spacing between the magnetic head and the magnetic disc can be decreased, which contributes to increase in recording density.

A basic concept of an in-contact magnetic head slider having an air-bearing surface that realizes forward flying and backward contact is known (see, for example, Jpn. Pat. Appln. KOKAI Publication No. 7-307069). In this Publication, the center of gravity of a head suspension system is adapted to substantially coincide with the point of action of fluid force such that, when a vibrating force accompanying vibration of the disc or impact to the apparatus acts on the slider, most of the vibrating force can be supported by air layer rigidity so as not to change the contact force.

Another arrangement of an in-contact magnetic head slider is also known. In this slider, pad surfaces (squeeze pads) exhibiting a squeeze effect are arranged on the side of the air outlet edge, which ensure the reliability during loading and unloading (see Jpn. Pat. Appln. KOKAI Publication No. 2002-92836).

In Jpn. Pat. Appln. KOKAI Publication Nos. 7-307069 and 2002-92836, however, the point of action of the suspension load is set on the side of the air inlet edge of the slider, unlike in a flying slider, which poses issues in manufacturing costs and development efficiency. In order to develop an in-contact slider to which the same suspension as in the flying slider can be applied, the slider must be able to realize a low contact force even when the point of action of the suspension load is located at the center in the longitudinal direction thereof, in the same manner as in the flying slider. To achieve the above design, the following configuration may be conceivable. That is, a positive pressure-generating region supporting a high suspension load is arranged at the central portion in the longitudinal direction of the slider and a negative pressure-generating region is arranged immediately after a pad formed closer to the inlet edge than the positive pressure-generating region such that the substantial point of action of the load would be shifted toward the air inlet edge of the slider. If the negative pressure on side of the inlet edge is increased with this scheme, however, problems occur that a difference in contact force, depending on a radial position, is increased although the contact force itself is decreased and the contact force is increased under a condition of a reduced pressure.

BRIEF SUMMARY OF THE INVENTION

It is an object of embodiments of the present invention to provide magnetic head assembly that uses the same suspension as that for a flying assembly.

A further object of embodiments of the invention is to provide an in-contact magnetic head slider that uses the same suspension as that for a flying slider and has a high impact resistance, and that makes it possible to suppress a difference in contact force depending on a disc radial position while realizing a lower contact force, and suppress an increase in contact force under a condition of a reduced pressure.

According to an embodiment of the invention, there is provided a magnetic head structure having a magnetic head operable to at least one of (1) read from and (2) write onto a magnetic recording medium upon rotation of the magnetic recording medium relative to the magnetic head. There is further provided a support member supporting the magnetic head and having an air bearing surface positioned adjacent the magnetic recording medium, when operating the magnetic head. The support member includes an air inlet region, an air outlet region, a first pad member and a second pad member. The air bearing surface has first and second surfaces formed on outer surfaces of the first and second pad members respectively and a third surface. The first, second and third surfaces are located in ascending order in a height direction from a level closest to the magnetic recording medium to a level furthest from the magnetic recording medium. The first and second pad members, and the third surface form a first positive pressure-generating region formed by positioning the first pad member at least partially overlying the second surface of the second pad member and positioning same at a central portion of the support member along a longitudinal direction thereof. A first negative pressure-generating region is formed by the third surface positioned between the air inlet region and the first positive pressure-generating region. A second negative pressure-generating region is formed by the third surface positioned between the first positive pressure-generating region and the air outlet region. The first positive pressure-generating region, the first negative pressure-generating region, and the second negative pressure-generating region form a first positive pressure, a first negative pressure and a second negative pressure respectively upon positioning of the support member adjacent the magnetic recording medium and rotating the magnetic recording medium.

According to yet another embodiment of the invention, there is provided a magnetic head structure having a magnetic head operable to at least one of (1) read from and (2) write onto a magnetic recording medium upon rotation of the magnetic recording medium relative to the magnetic head and a support member supporting the magnetic head and having an air bearing surface positioned, when operating the magnetic head, adjacent the magnetic recording medium. The support member includes an air inlet region; an air outlet region; a first pad member having a first thickness and a first surface; a second pad member having a second thickness and a second surface; and a third surface supporting the first and second pad members. The first, second and third surfaces are located in ascending order in a height direction from a level closest to the magnetic recording medium to a level furthest from the magnetic recording medium. The second pad member has a first central part, a first outlet side pad part and a first bridge part connected therebetween. The second pad member has second central part, a second outlet side pad part and a second bridge part connected therebetween. A first negative pressure-generating region is formed on the third surface adjacent the air inlet region. A first positive pressure-generating region is formed substantially on the first surface; and a second negative pressure-generating region is formed on the third surface between the first and second bridge parts and the first and second outlet side pad parts. The first positive pressure-generating region, the first negative pressure-generating region, and the second negative pressure-generating region form a first positive pressure, a first negative pressure and a second negative pressure respectively upon positioning of the support member adjacent the magnetic recording medium and rotating the magnetic recording medium.

According to yet other embodiments of the invention there is disclosed a method of supporting a magnetic head for at least one of reading from and writing onto a magnetic medium. The method comprising securing the magnetic head to a support structure, and forming on a surface of the support structure, first and second disjoint negative pressure-generating regions with a positive pressure-generating region therebetween. The first and second negative pressure-generating regions and positive pressure-generating region producing first and second negative pressure regions and a positive pressure region respectively by means of air flow between the magnetic medium and the surface of the support structure upon rotation of the magnetic medium and positioning the support structure adjacent the magnetic medium.

According to an embodiment of the present invention, there is provided an in-contact magnetic head slider comprising a magnetic head held on a magnetic recording medium during write and read, in which steps are formed on an air-bearing surface thereof including first, second and third surfaces located in this order in a height direction from a level closest to the magnetic recording medium so as to form negative and positive pressure-generating regions, with which write and read are performed under a condition in contact with the magnetic recording medium utilizing a pressure of air flowing in from one end and flowing out to the other end along the air-bearing surface as the magnetic recording medium rotates, comprising: a first positive pressure-generating region having the second and first surfaces formed at a central portion along a longitudinal direction thereof; a first negative pressure-generating region having the third surface formed on a side of an air inlet edge with respect to the first positive pressure-generating region; a second negative pressure-generating region having the third surface formed on a side of an air outlet edge with respect to the first positive pressure-generating region; and a contact pad having the first surface formed at an air outlet edge.

According to another embodiment of the present invention, there is provided a magnetic head assembly comprising the above in-contact magnetic head slider.

According to still another embodiment of the present invention, there is provided a magnetic recording apparatus comprising a magnetic recording medium mounted rotatably, and the above magnetic head assembly arranged to be movable in a radial direction of the magnetic recording medium.

DETAILED DESCRIPTION OF THE INVENTION

Embodiments of the present invention will be described with reference to the accompanying drawings.

Figure 1:
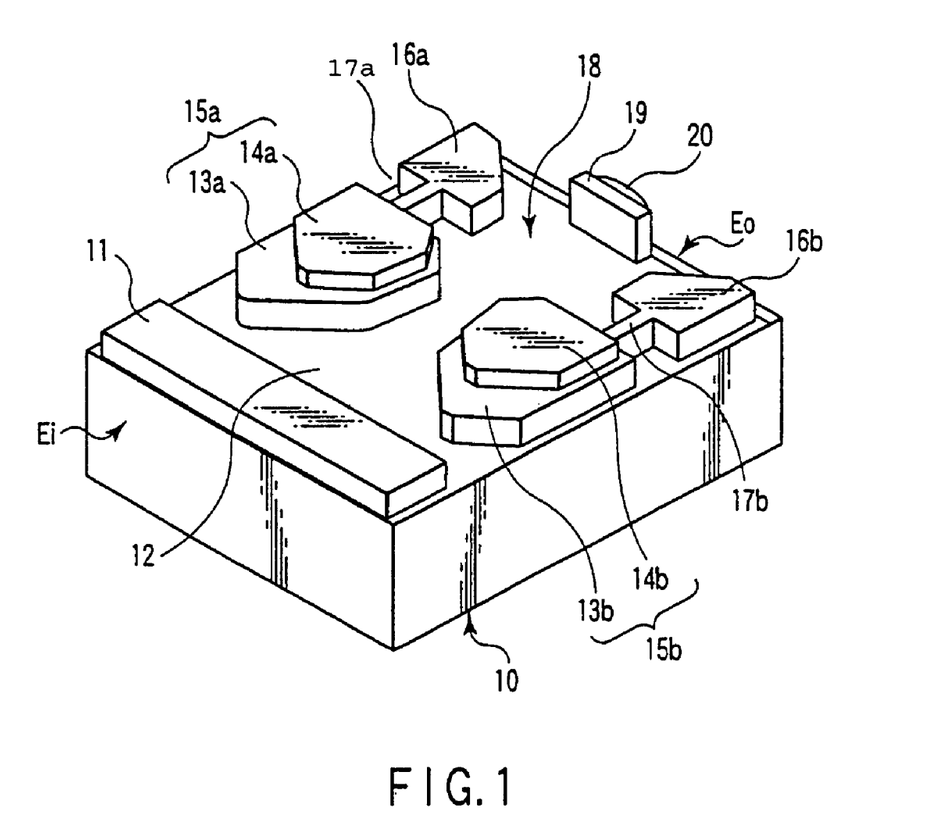
FIG. 1 is a perspective view of an in-contact magnetic head slider according to an embodiment of the present invention viewed from the air-bearing surface.
Figure 2A:
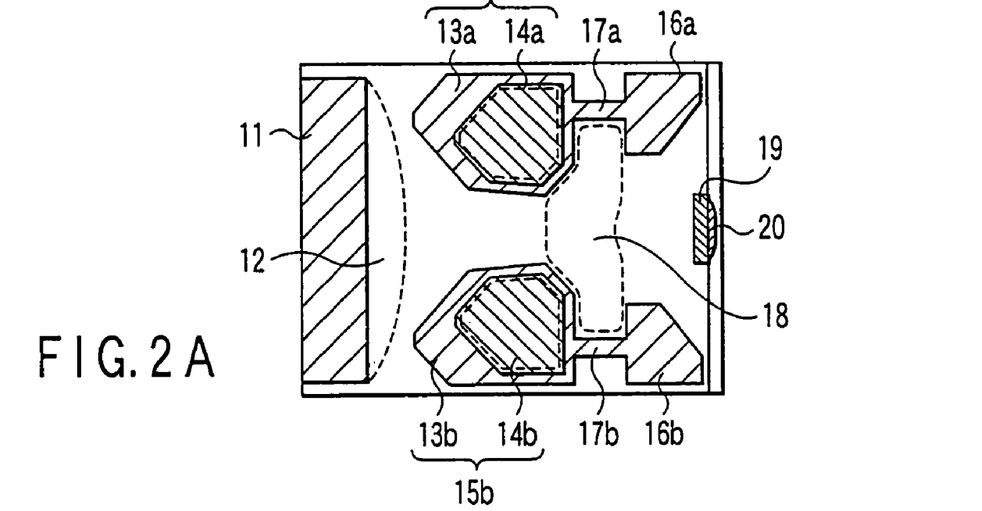
FIG. 2A is a plan view showing the air-bearing surface of the in-contact magnetic head slider of FIG. 1.
Figure 2B:
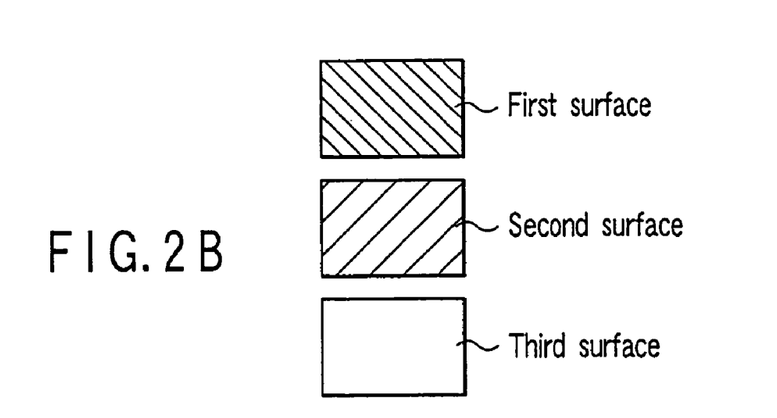
FIG. 2B is a plan view for explaining how the first to third surfaces of the head slider are indicated.
Figure 2C:
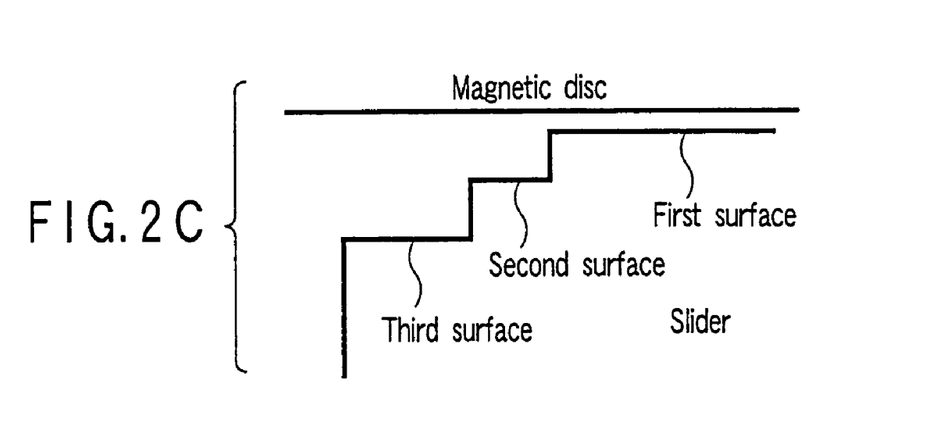
FIG. 2C is a view for explaining the heights of the first to third surfaces of the head slider from a magnetic head.
Figure 3:
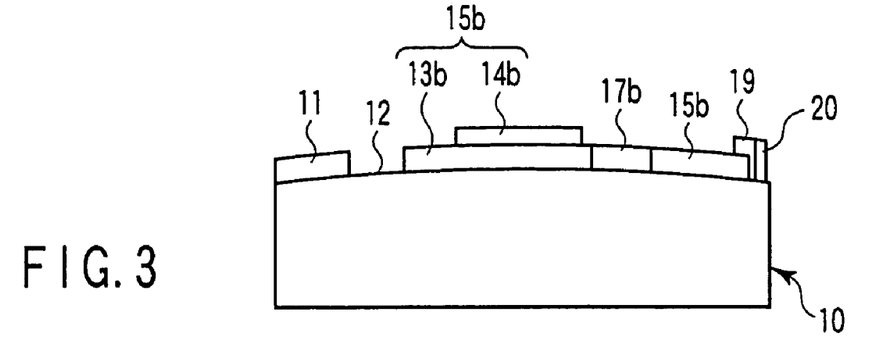
FIG. 3 is a view showing the side elevation of the in-contact magnetic head slider of FIG. 1 along the longitudinal direction of the slider.
Figure 4:
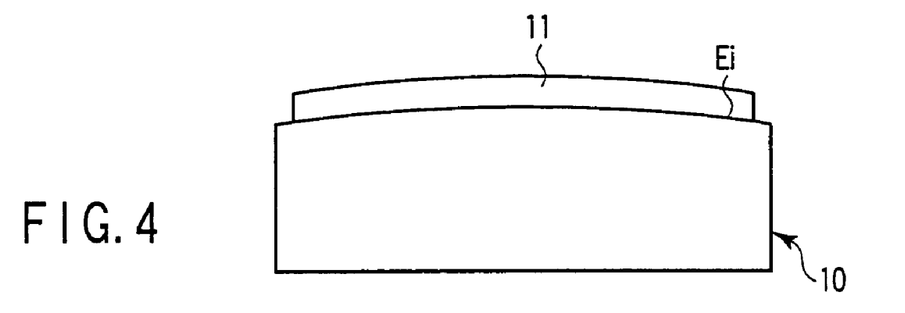
FIG. 4 is an end view showing the air inlet edge of the in-contact magnetic head slider of FIG. 1.

FIG. 1 is a perspective view of an in-contact magnetic head slider according to an embodiment of the present invention viewed from the air-bearing surface (i.e., from the magnetic disc). FIG. 2A is a plan view showing the air-bearing surface of the head slider, and FIGS. 2B and 2C are views for explaining the first to third surfaces of the head slider. FIG. 3 is a view showing the side elevation of the head slider along the longitudinal direction of the slider. FIG. 4 is an end view showing the air inlet edge of the head slider.

The air-bearing surface (to be referred to as the slider ABS hereinafter) of the in-contact magnetic head slider 10 according to the embodiment of the present invention has three surfaces different in height formed by ion-milling the slider ABS from a slider substrate. As shown in FIG. 2C, the three surfaces are defined as the first, second, and third surfaces that are located in this order from the level closer to the magnetic disc. The individual projection that forms the first or second surface will be referred to as a pad. To discriminate the three surfaces, as shown in FIG. 2B, the first and second surfaces are hatched in different directions, and the third surface is not hatched.

The steps formed by the first to third surfaces constitute negative pressure-generating regions and positive pressure-generating regions. A negative pressure-generating region is a portion where an air channel changes in a widening direction or, for example, a stepped portion where a cavity is formed downstream of a projecting pad. Conversely, a positive pressure-generating region is a portion where an air channel changes in a narrowing direction or, for example, a stepped portion where a pad is formed downstream of a cavity. The exemplified negative and positive pressure-generating regions are based on the steps between the magnetic disc and slider. In the widthwise direction of the slider ABS, when the air channel widens, a negative pressure is generated, and when the air channel narrows, a positive pressure is generated.

The arrangement of the slider ABS will be described with reference to FIGS. 1, 2A, 3, and 4. The head slider is held by a suspension (not shown) to oppose the magnetic disc with its slider ABS. When the magnetic disc rotates, air flows in from the air inlet edge Ei, and flows out from the air outlet edge Eo. In the in-contact magnetic head slider according to the embodiment of the present invention, the load from the suspension is substantially applied to the center of gravity of the slider (geometrically, substantially the central position along the longitudinal direction of the slider). As such a suspension, one applied to the conventional flying head slider can be utilized.

The inlet edge pad 11 is formed at that position of the head slider closest to the air inlet edge. The inlet edge pad 11 has a second surface extending to the slider widthwise direction almost entirely. A region located immediately downstream of the inlet edge pad 11 is the third surface which forms a cavity. The third surface serves as a first negative pressure-generating region 12 on the side of the inlet edge and is shown in dotted line contour in FIG. 2A. The structure for forming the first negative pressure-generating region includes the inlet edge pad 11 having a thickness above the third surface so that a step down structure is formed between the inlet edge pad 11 and the third surface.

The inlet edge pad 11 is not connected to the outer pads, i.e., is formed separate from the other pads. In the case where the first negative pressure-generating region 12 located immediately after the inlet edge pad 11 desirably generates a comparatively low negative pressure, it is advantageous to form the inlet edge pad 11 separate from the other pads because an appropriate negative pressure can be generated. In this embodiment, although one inlet edge pad 11 is formed, two or more inlet edge pads may be formed.

Conversely, assume that a negative pressure on the side of the inlet edge must be increased. In this case, the inlet edge pad 11 having the second surface and the second surfaces of positive pressure-generating regions (central pads 15a and 15b to be described later) may be connected to surround the first negative pressure-generating region 12. Then, a high negative pressure can be generated efficiently.

At the central portion along the longitudinal direction of the slider, the two central pads 15a and 15b are formed on the two side portions along the widthwise direction of the slider, so as to sandwich the third surface. The central pad 15a has a second surface 13a and first surface 14a. The central pad 15b has a second surface 13b and first surface 14b. The central pads 15a and 15b serve as the first positive pressure-generating regions. The first positive pressure-generating region is formed substantially over the entire surface of the first surface 14a and second surface 14b of the central pads 15a and 15b respectively. This region extends slightly downstream of the first surface 14a and second surface 14b over the third surface 12 until it abuts the second negative pressure-generating region 18 as explained below and shown in dotted line contour in FIG. 2A. Thus, the structure for forming the first positive pressure region is the step-up structure provided by the surfaces 12, 13a and 14a and the step up structure provided by the surfaces 12, 13b and 14b. The upstream portions of the second and first surfaces that form the central pads 15a and 15b are machined obliquely. Thus, air flowing in the vicinity of the third surface can readily flow to the central portion of the slider.

On the side of the outlet edge along the longitudinal direction of the slider, two outlet side pads 16a and 16b are formed on the two side portions along the widthwise direction of the slider so as to sandwich the third surface. The outlet side pads 16a and 16b have second surfaces, respectively. The downstream portions of the outlet side pads 16a and 16b are machined obliquely. Thus, air flowing in the vicinity of the third surface can readily flow out from the air outlet edge. With the outlet side pads 16a and 16b, a so-called squeeze effect can be obtained.

On the two side portions along the widthwise direction of the slider, the second surfaces 13a and 13b of the central pads 15a and 15b and the outlet side pads 16a and 16b are connected to each other through bridges 17a and 17b, respectively. The width of each of the bridges 17a and 17b is smaller than the width of that one having a small width on the connecting surface among the second surfaces 13a and 13b of the central pads 15a and 15b and the outlet side pads 16a and 16b (in this case, the width of the outlet side pad).

The downstream region located nearly adjacent and downstream of the central pads 15a and 15b on the third surface 12 forms a cavity. This region serves as a second negative pressure-generating region 18 (shown in dotted lines in FIG. 2A) on the side of the outlet edge and is formed adjacent the first positive pressure-generating region. The structure for forming the negative pressure-generating region is the step-down structure formed by the thicker (in a direction above the third surface) central pads 15a, 15b followed downstream thereof by the lower third surface. Additional structure includes the bridge members 17a, 17b and the outlet side pads both of which are positioned above and surrounding a portion of the third surface to thus form a cavity region designated by 18. When the negative pressure on the side of the inlet edge is comparatively low, the negative pressure on the side of the outlet edge to balance it must also be low. To generate a low negative pressure on the side of the outlet edge in this manner, it is appropriate to utilize changes in step immediately after the central pads 15a and 15b serving as the first positive pressure-generating region.

As described above, the second surfaces 13a, 13b of the central pads 15a and 15b and the outlet side pads 16a and 16b are connected to each other through the bridges 17a and 17b, respectively. In this arrangement, the bridges 17a and 17b and outlet side pads 16a and 16b are present on the two sides of the second negative pressure-generating region 18 along the widthwise direction of the slider. Accordingly, since air does not leak to the outside at the positions of the bridges 17a and 17b, a comparatively high negative pressure can be generated efficiently.

A contact pad 19 having the first surface is formed at the central portion of the air outlet edge Eo. A magnetic head 20 is formed in contact with the contact pad 19.

The in-contact magnetic head slider according to the present invention suffices as far as it satisfies the following conditions. Namely, the first negative pressure-generating region must be formed on the side of the air inlet edge with respect to the first positive pressure-generating region. The second negative pressure-generating region must be formed on the side of the air outlet edge with respect to the first positive pressure-generating region. The in-contact magnetic head slider according to the present invention described above with reference to FIGS. 1 to 4 is formed to obtain the best effect.

Next, parameters that were studied by the inventor in reaching the above arrangement will be described on the basis of the function and effect of the in-contact magnetic head slider with reference to modifications other than the arrangement of FIGS. 1 to 4 as well.

Figure 5:
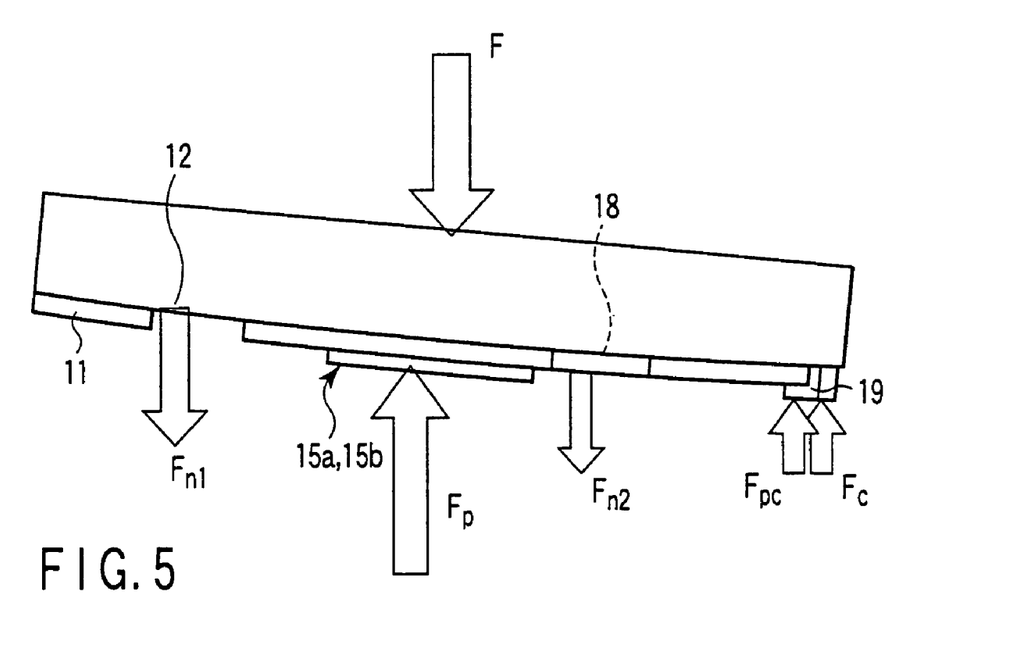
FIG. 5 is a view showing forces acting on the in-contact magnetic head slider.

FIG. 5 shows forces acting on the slider when the slider is viewed from side surface thereof. The forces acting on the slider include a load F, positive pressures $F_p$ and $F_{pc}$, a contact force $F_c$, and negative pressures $F_{n1}$ and $F_{n2}$. The load F is applied by the suspension (not shown). The positive pressure $F_p$ acts on the central pads 15a and 15b. The contact force $F_c$ is applied from the magnetic disc when the contact pad 19 comes into contact with the magnetic disc. The positive pressure $F_{pc}$ is generated only slightly in the contact pad 19. The negative pressure $F_{n1}$ acts on the first negative pressure-generating region 12 located immediately after the inlet edge pad 11. The negative pressure $F_{n2}$ acts on the second negative pressure-generating region 18 located immediately after the central pads 15a and 15b. $F_{n1}$ and $F_{n2}$ will be referred to as the negative pressures on the side of the inlet and outlet edges, respectively. When the negative pressure acting on the entire slider is defined as $F_n$, $F_n$ is expressed by the following equation (1):

$$F_n = F_{n1} + F_{n2} \qquad (1).$$

The balances among the acting forces and moments shown in FIG. 5 are expressed as in the following equations (2) and (3). M in equation (3) is the rotation moment applied by the suspension (not shown). l in equation (3) indicates the distance between the point of action (substantially equal to the center of gravity of the slider) on which the load F from the suspension acts and the points of action for the respective forces. The suffix of the distance corresponds to that of the force.

$$-F - F_{n1} - F_{n2} + F_p + F_{pc} + F_c = 0 \qquad (2),$$

$$-F_{n1}l_{n1} + F_{n2}l_{n2} + F_p l_p - F_{pc}l_{pc} - F_c l_c + M = 0 \qquad (3).$$

In the in-contact magnetic head slider, wear of the contact pad 19 largely influences the reliability of the apparatus. To decrease the wear, the contact force $F_c$ applied to the contact pad 19 from the magnetic disc must be decreased. The design approach to decrease the contact force $F_c$ by changing the configuration of the ABS includes the following three schemes.

(i) To enlarge the central pads 15a and 15b. This scheme aims at applying a high positive pressure Fp to large central pads, to decrease the contact force: $F_c = F + F_n - F_p - F_{pc}$.

(ii) To shift the positions of the central pads 15a and 15b toward the outlet edge. This scheme aims at decreasing the spacing between the central pads 15a and 15b and the magnetic disc. Then, a high positive pressure $F_p$ is applied to the central pads 15a and 15b, to decrease the contact force $F_c$ in the same manner as in (i).

(iii) To decrease the length of the inlet edge pad 11 along the longitudinal direction of the slider. This scheme aims at increasing the area of the first negative pressure-generating region 12 between the inlet edge pad 11 and the central pads 15a and 15b. Then, the negative pressure $F_{n1}$ on the side of the inlet edge is increased, and a moment is thus increased in a direction (tending to cause counter-clockwise rotation as seen in FIG. 5) to partially cancel the rotation moment applied by the forces $F_p$ and $F_{n2}$ tending to cause clockwise rotation. Accordingly, the contact force may be decreased.

To change the shapes of the central pads 15a and 15b is limited by the following two reasons. First, the downstream ends of the first surfaces of the central pads 15a and 15b cannot be shifted toward the outlet edge over a certain tolerance value. This is to prevent a lubricant applied to the surface of the magnetic disc from attaching to the first surfaces of the central pads 15a and 15b. Second, the widths of the central pads 15a and 15b cannot be increased toward the center along the widthwise direction of the slider. The gap between the central pads 15a and 15b serves as an air channel along the third surface. If the gap is excessively narrow, the pressure generated on the side of the air outlet edge decreases. This adversely affects the pressure distribution on the side of the outlet edge.

To decrease the contact force $F_c$ under these limitations, as described in the item (iii), it is most preferable to increase the area of the first negative pressure-generating region 12 between the inlet edge pad 11 and the central pads 15a and 15b so as to generate the negative pressure on the side of the inlet edge as much as possible.

When the negative pressure generated on the side of the inlet edge is merely increased, the following problems arise. For example, when the pressure is reduced or the rotating velocity is changed, the negative pressure on the side of the outlet edge changes accordingly. Then, a change in moment that acts in a direction to push the contact pad 19 against the magnetic disc about the center of gravity of the slider increases. This leads to a change in contact force $F_c$. In particular, if the contact force $F_c$ is increased under a reduced pressure (0.7 atm) at the maximum usage altitude (about 3,000 m) required for the magnetic disc apparatus, the wear reliability degrades, that is, the apparatus reliability degrades. Also, if the contact force $F_c$ varies at the respective radial positions on the magnetic disc, the range of the upper and lower limits of the contact force $F_c$ may be widened, which is not preferable.

Figure 6A:
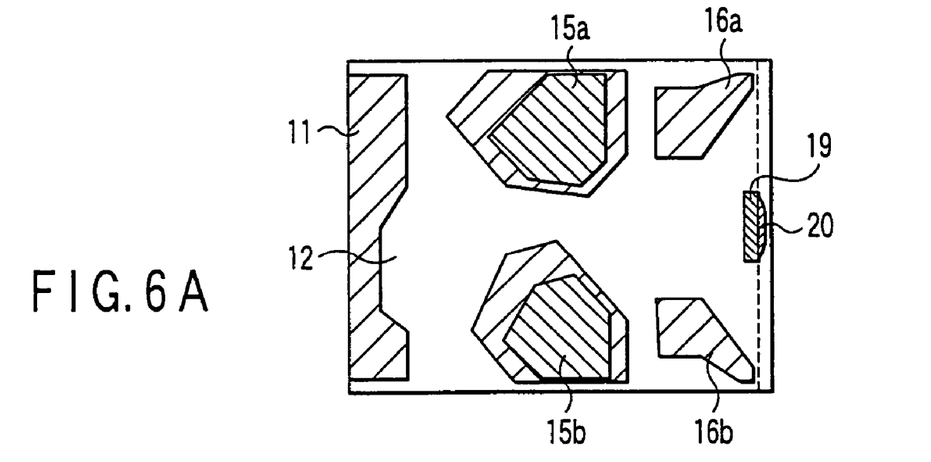
FIGS. 6A to 6C are plan views showing the air-bearing surfaces of three types of head sliders in which the respective first negative pressure-generating regions have different areas.
Figure 6B:
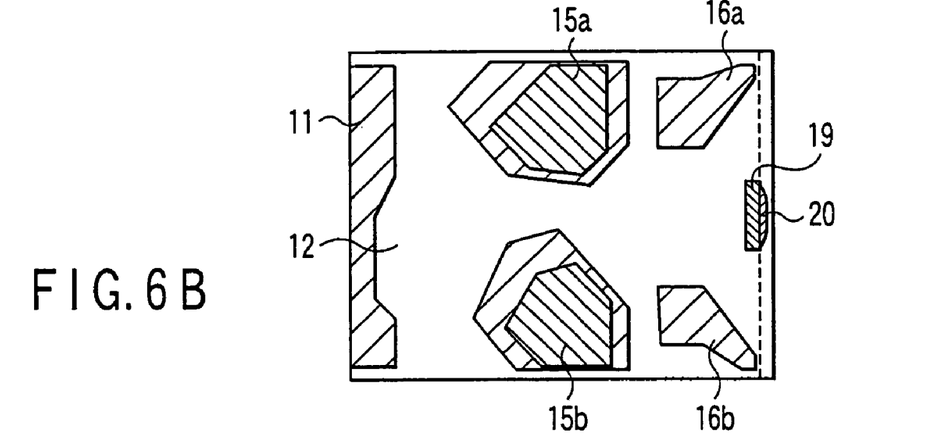
Figure 6C:
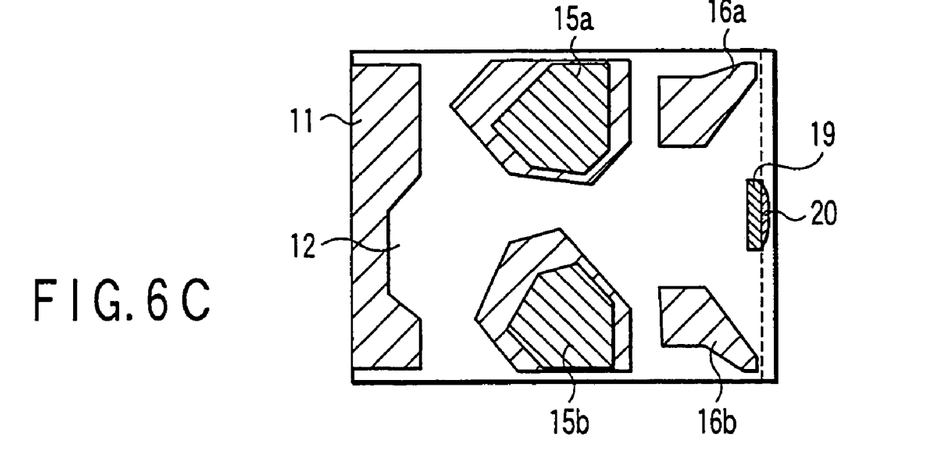

In view of this, only the area of the first negative pressure-generating region 12 was changed, and its influence was studied. FIGS. 6A to 6C are plan views showing the air-bearing surfaces of three different types of head sliders. In each of FIGS. 6A to 6C, the length of the inlet edge pad 11 along the longitudinal direction of the slider is adjusted to change the area of the first negative pressure-generating region 12. In FIG. 6A, the inlet edge pad 11 has a normal length (Normal). In FIG. 6B, the length of the inlet edge pad 11 is decreased toward the inlet edge by 30 μm (Lpad-l). In FIG. 6C, the length of the inlet edge pad 11 is increased toward the outlet edge by 30 μm (Lpad-t). In each of the head sliders of FIGS. 6A to 6C, the second surfaces of the central pads 15a and 15b and the outlet side pads 16a and 16b are not connected to each other through bridges, which makes possible that air flows out through the side edges of the head slider. Therefore, the negative pressure on the side of the outlet edge may be rather small.

Figure 7A:
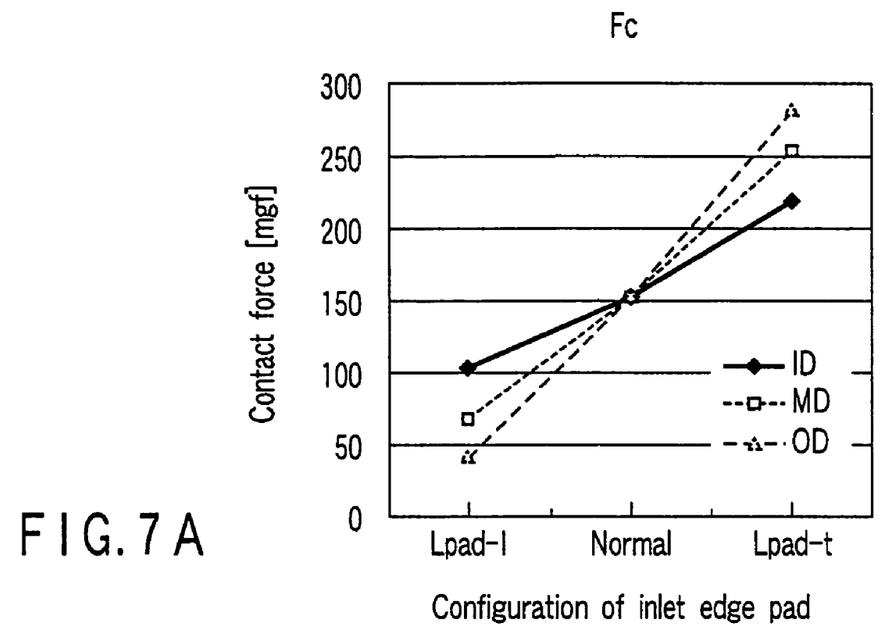
FIG. 7A is a graph showing the results obtained by calculating contact forces Fc of the head sliders of FIGS. 6A to 6C on the inner periphery (ID), intermediate position (MD), and outer periphery (OD) of the magnetic disc.
Figure 7B:
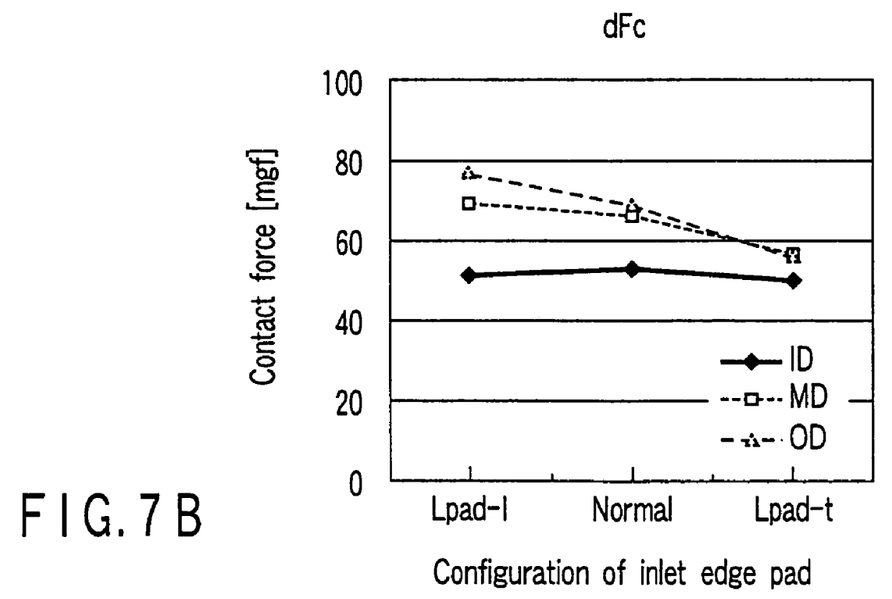
FIG. 7B is a graph showing the results obtained by calculating contact force increase amounts dFc of the head sliders of FIGS. 6A to 6C under a reduced pressure on the inner periphery (ID), intermediate position (MD), and outer periphery (OD) of the magnetic disc.

FIGS. 7A and 7B show the results obtained by calculating the contact forces $F_c$ and contact force increase amounts dFc under a reduced pressure, respectively, of the three different head sliders on the inner periphery (ID), intermediate position (MD), and outer periphery (OD) of the magnetic disc. Here, dFc is mean to represent a change (or "delta") in contact force so that the actual contact force under the case of a reduced pressure (such as in an airplane, etc) would be the sum of the value shown in FIG. 7A and FIG. 7B.

The influence on the contact force Fc shown in FIG. 7A is as follows. In the case of Normal, the contact force does not change regardless of the position on the magnetic disc. In the case of Lpad-l in which the length of the inlet edge pad 11 is decreased to increase the negative pressure, the contact force decreases by about 50 mgf on the inner periphery and about 110 mgf on the outer periphery compared to Normal. The difference in contact force between the outer and inner peripheries of the magnetic disc is about −60 mgf. In the case of Lpad-t in which the length of the inlet edge pad 11 is increased to decrease the negative pressure, a tendency opposite to that of the case of Lpad-l is shown.

The influence on the contact force increase amounts dFc under the reduced pressure shown in FIG. 7B is as follows. Under the reduced pressure, the contact force increases in all the three cases, but the influence is low on the inner periphery (ID) where the rotating velocity of the magnetic disc is low, and high on the outer periphery (OD) where the rotating velocity of the magnetic disc is high. In other words, in the case of Lpad-l in which the length of the inlet edge pad 11 is decreased to increase the negative pressure, the contact force increase amounts increase by about 10 mgf compared to Normal.

As described above, where only the negative pressure on the side of the inlet edge is increased by decreasing the length of the inlet edge pad 11, a difference occurs in the contact force Fc between the outer and inner peripheries although the contact force Fc decreases, and also the contact force increase amounts under the reduced pressure increase. Thus, a good result cannot always be obtained.

To solve these problems, the present inventor has arrived at an idea that it is effective to generate negative pressures on the side of the outlet edge as well as on the side of the inlet edge such that the two negative pressures balance. Hence, the present inventor has studied, in order to generate the negative pressure efficiently on the side of the outlet edge, to connect the second surfaces of the central pads 15a and 15b and the outlet side pads 16a and 16b to form a negative pressure-generating region surrounded by the pads (the steps of the second surfaces) on the side of the outlet edge.

Figure 8A:
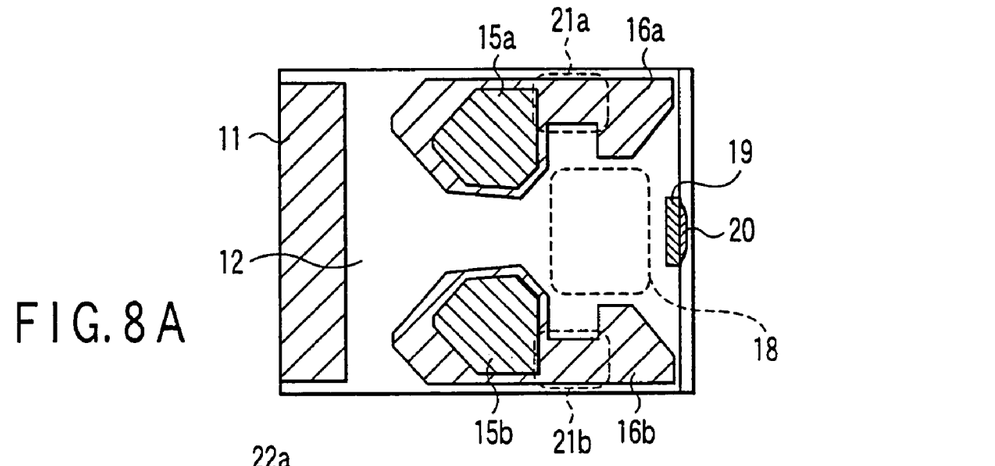
FIGS. 8A to 8C are plan views each showing the air-bearing surface of a head slider in which the second surfaces of the central pads and the outlet side pads are connected.
Figure 8B:
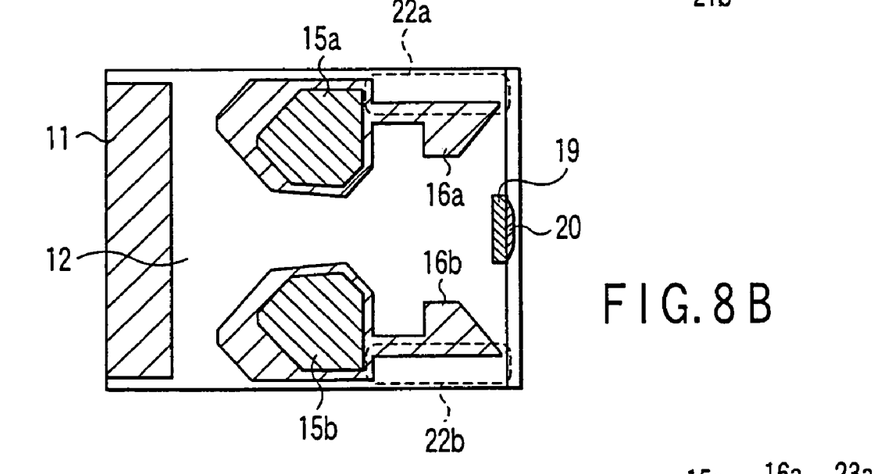
Figure 8C:
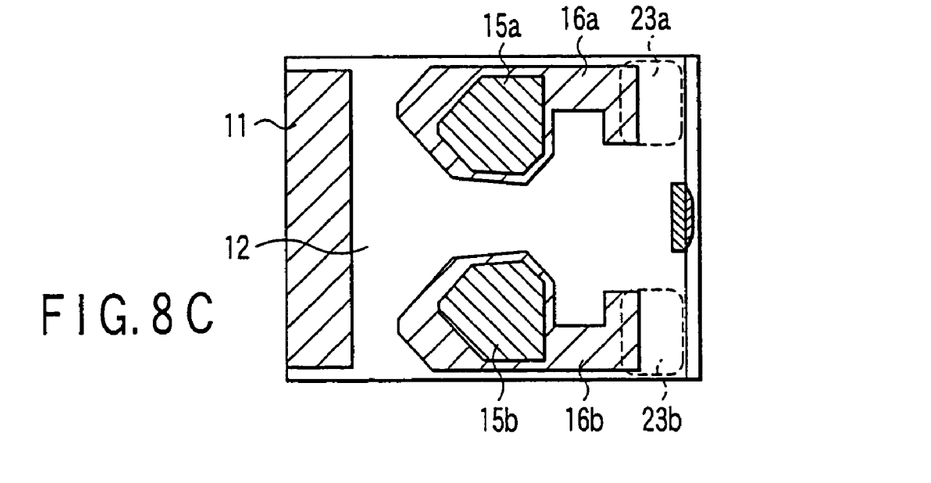

FIGS. 8A to 8C are plan views each showing the air-bearing surface of a head slider in which the second surfaces of the central pads 15a and 15b and the outlet side pads 16a and 16b are connected to each other through connection regions 21a and 21b. These head sliders will be described.

With the arrangement of FIG. 8A, a negative pressure-generating region 18 surrounded by pads can be formed, and a comparatively high negative pressure can be generated even on the side of the outlet edge. The inner ends of the connection regions 21a and 21b along the widthwise direction of the slider are located on the outside to the inner ends of the second surfaces of the central pads 15a and 15b. When air flows from the gap between the second surfaces of the central pads 15a and 15b to the gap between the connection regions 21a and 21b, the air channel widens. This also becomes a cause to generate a negative pressure. If the areas of the connection regions 21a and 21b are large, however, the pressure-reducing characteristics (a change in contact force under a reduced pressure) tend to degrade. It has been found that this tendency can be prevented by the designs shown in FIGS. 8B and 8C. In FIG. 8B, portions 22a and 22b positioned near the side edges of the outlet side pads 16a and 16b and the connecting regions are removed. In FIG. 8C, portions 23a and 23b positioned near the outlet edge of the outlet side pads 16a and 16b are removed. If the removing areas of the portions 22a and 22b positioned near the side edges shown in FIG. 8B are increased or the portions 23a and 23b positioned near the outlet edge shown in FIG. 8C are removed, problems may occur. More specifically, the squeeze effect may decrease, or the roll rigidity may decrease.

Figure 9A:
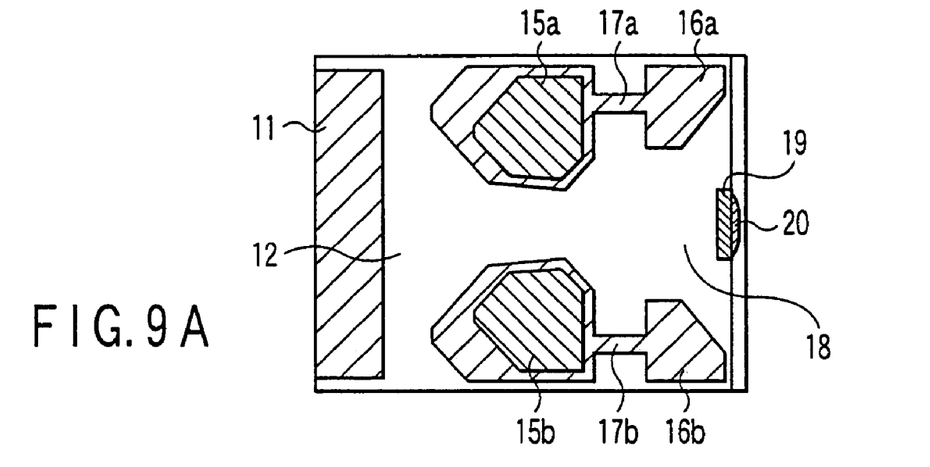
FIGS. 9A to 9C are plan views each showing the air-bearing surface of a head slider in which the second surfaces of the central pads and the outlet side pads are connected through bridges.
Figure 9B:
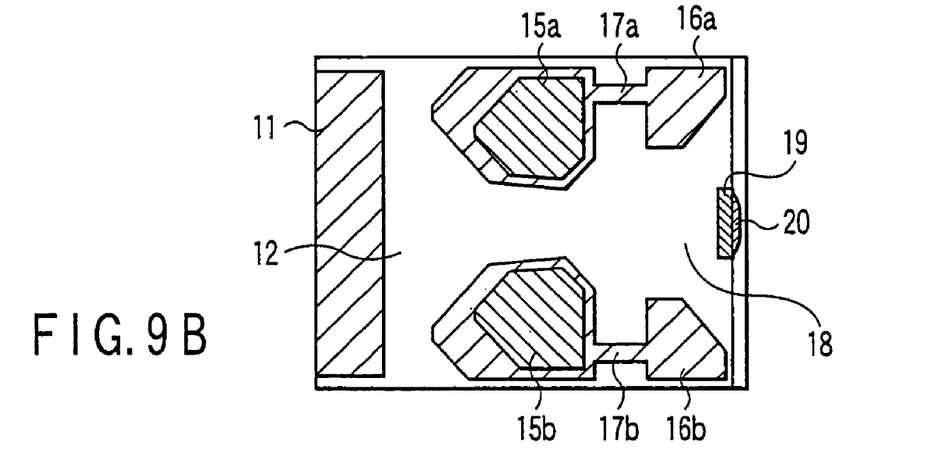
Figure 9C:
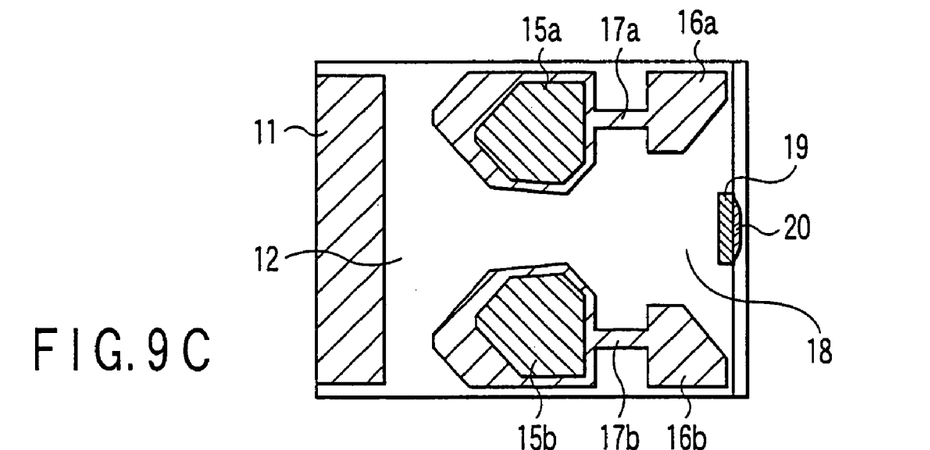

The present inventor has found that, in order to solve these problems, it is desirable to remove the outer end portions in the widthwise direction of the slider at positions away as much as possible from the outlet edge. More specifically, as shown in FIGS. 9A to 9C, the second surfaces of the central pads 15a and 15b and the outlet side pads 16a and 16b may be bridged to each other. Portions 17a and 17b will be called bridges. As shown in FIGS. 9A to 9C, the width of each of the bridges 17a and 17b is smaller than the width of any one of the second surfaces of the central pads 15a and 15b and of the outlet side pads 16a and 16b. The outer ends of the bridges 17a and 17b along the widthwise direction of the slider are located on the inside to the outer ends of the second surfaces of the central pads 15a and 15b and outlet side pads 16a and 16b along the widthwise direction of the slider.

The positions of the bridges 17a and 17b of FIG. 9A are defined as normal positions (Normal). FIG. 9B shows a case in which the positions of the bridges 17a and 17b along the widthwise direction of the slider are shifted to the outside to the normal positions (Bridge-w). FIG. 9C shows a case in which the positions of the bridges 17a and 17b along the widthwise direction of the slider are shifted to the inside to the normal positions (Bridge-n). Although not shown, a case in which no bridge is formed is also assumed (Bridge-non).

Figure 10A:
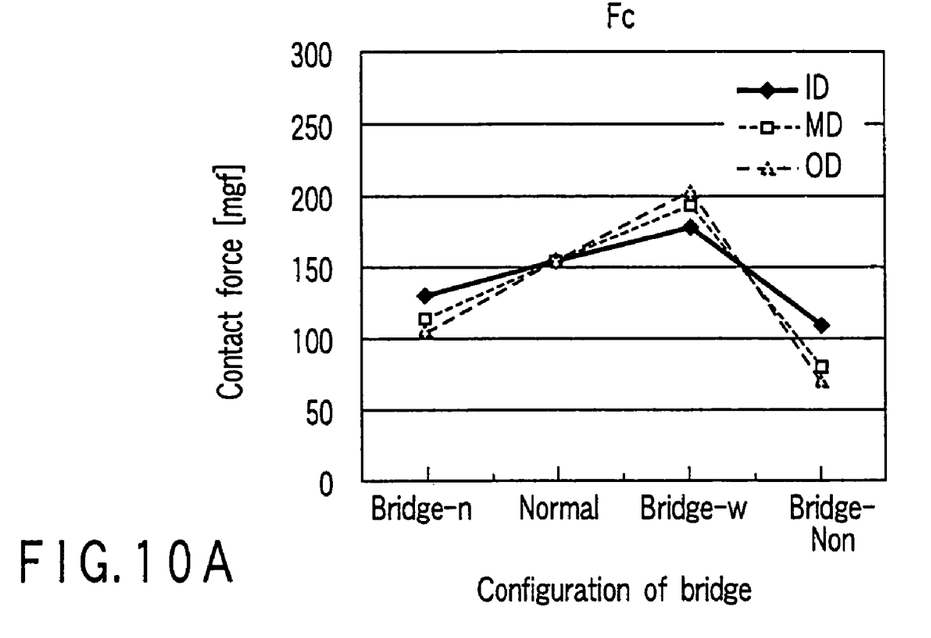
FIG. 10A is a graph showing the results obtained by calculating the contact forces Fc of the head sliders of FIGS. 9A to 9C on the inner periphery (ID), intermediate position (MD), and outer periphery (OD) of the magnetic disc.
Figure 10B:
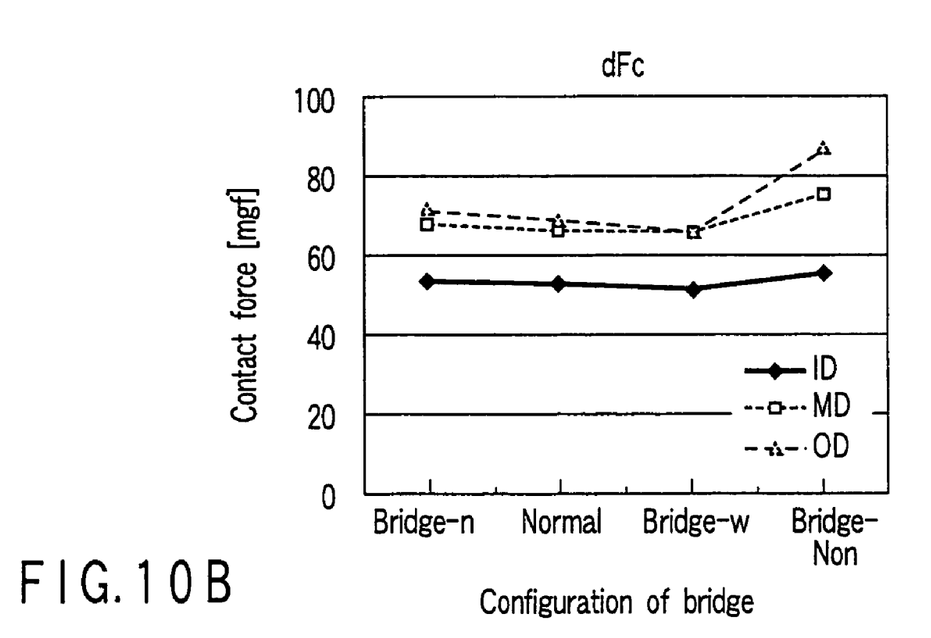
FIG. 10B is a graph showing the results obtained by calculating the contact force increase amounts dFc of the head sliders of FIGS. 9A to 9C under a reduced pressure on the inner periphery (ID), intermediate position (MD), and outer periphery (OD) of the magnetic disc.

FIGS. 10A and 10B are graphs showing the results obtained by calculating the contact forces Fc and the contact force increase amounts dFc under a reduced pressure for the above head sliders on the inner periphery (ID), intermediate position (MD), and outer periphery (OD) of the magnetic disc.

The influence on the contact force Fc shown in FIG. 10A is as follows. With no bridge (Bridge-non), the contact force decreases at any radial position. The difference (outer periphery−inner periphery) in contact force between the outer and inner peripheries is about −40 mgf. If this is combined with an arrangement in which the negative pressure on the side of the inlet edge is increased as described above, the contact force is excessively low, which is inconvenient. When the bridges are shifted to the outside along the widthwise direction of the slider (Bridge-w), the contact force increases by about 40 mgf compared to that of the normal positions (Normal). The difference (outer periphery−inner periphery) in contact force between the outer and inner peripheries is about 25 mgf. In this manner, a change in contact force shown in FIG. 7A, which occurs when only the negative pressure on the side of inlet edge is increased, can be canceled.

The influence on the contact force increase amounts dFc under the reduced pressure shown in FIG. 10B is as follows. With no bridge (Bridge-non), the contact force increases at any radial position. In particular, on the outer periphery where the rotating velocity of the magnetic disc is high, the contact force increases as much as by about 20 mgf compared to that of the normal positions (Normal). When the bridges are shifted to the outside along the widthwise direction of the slider (Bridge-w), the contact force slightly decreases at the respective radial positions.

As described above, to suppress a difference in contact force depending on the radial position while decreasing the contact force, and to suppress an increase in contact force under a reduced pressure, it is significant to increase the negative pressure on the side of the inlet edge as well as on the side of the outlet edge, so as to optimize the contact force on the magnetic head 20. For this purpose, the second surfaces of the central pads and the outlet side pads are preferably connected to each other.

A magnetic head assembly and magnetic recording/reading apparatus each having an in-contact magnetic head slider according to the embodiment of the present invention will be described.

Figure 11:
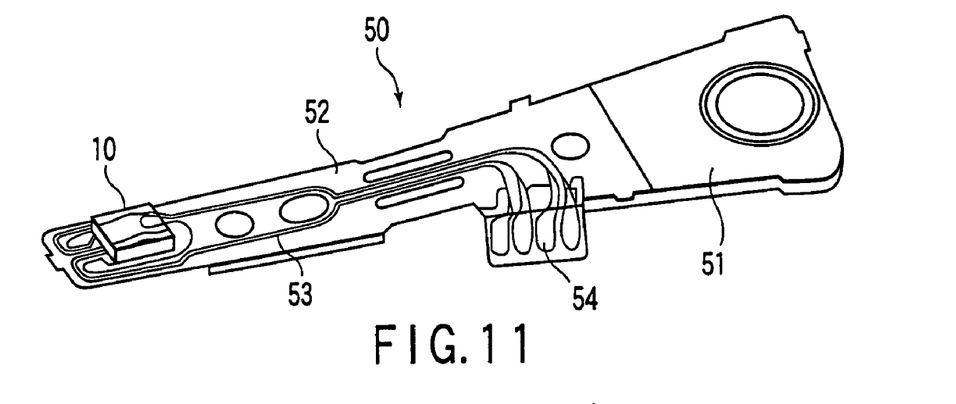
FIG. 11 is a perspective view of a magnetic head assembly having an in-contact magnetic head slider according to an embodiment of the present invention viewed from the disc.

FIG. 11 is a perspective view of a magnetic head assembly 50 having the in-contact magnetic head slider 10 according to the embodiment of the present invention viewed from the disc. The actuator arm 51 has a hole with which it is mounted on a pivot in a magnetic disc apparatus. The actuator arm 51 also has a bobbin section for holding a driving coil (not shown). The suspension 52 is fixed to one end of the actuator arm 51. The in-contact magnetic head slider 10 described above is attached to the distal end of the suspension 52. The suspension 52 has signal write/read lead wires 53. One end of each lead wire 53 is connected to the corresponding electrode of a magnetic head built in the head slider 10. The other end of each lead wire 53 is connected to a corresponding electrode pad 54.

Figure 12:
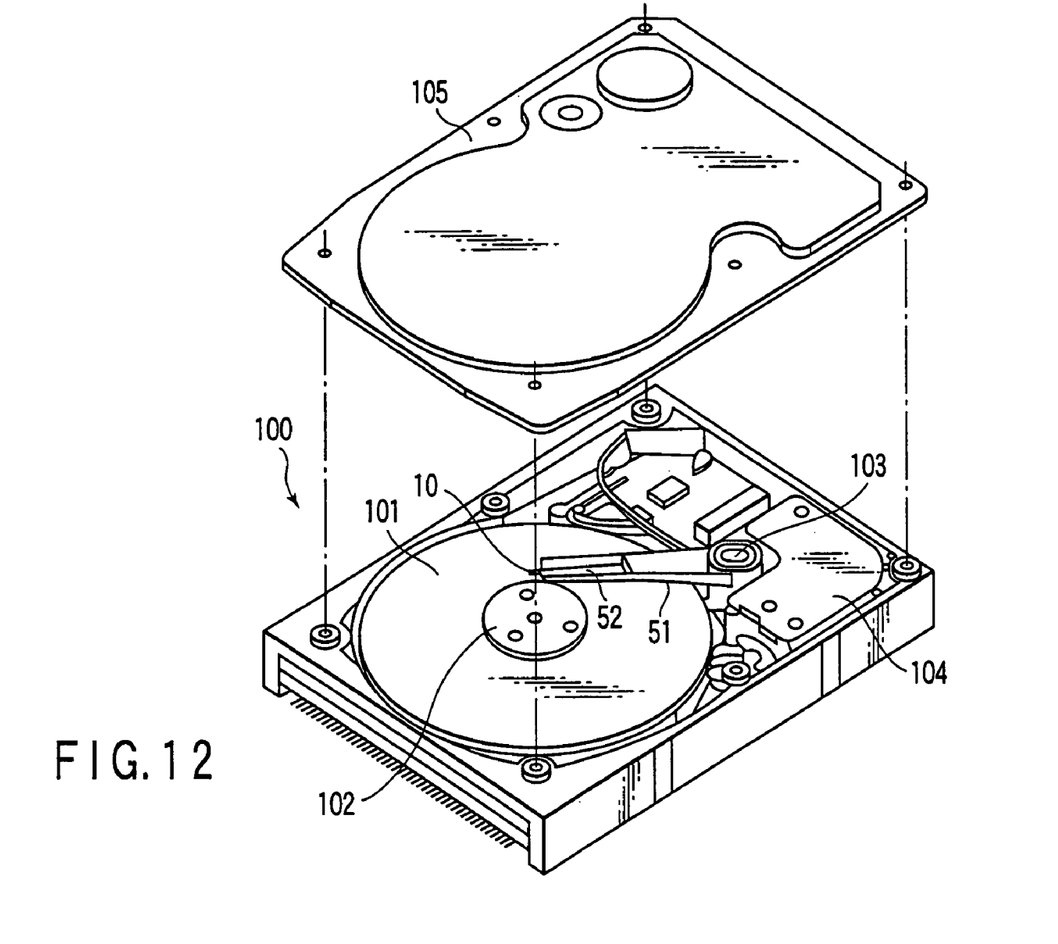
FIG. 12 is a perspective view showing the internal structure of a magnetic recording apparatus in which the magnetic head assembly shown in FIG. 11 is mounted.

FIG. 12 is a perspective view showing the internal structure of a magnetic recording apparatus (hard disc drive) 100 in which the magnetic head assembly shown in FIG. 11 is mounted. The magnetic disc 101 is mounted on the spindle 102, and rotates in response to control signals from a driving unit controller (not shown). The actuator arm 51 as shown in FIG. 11 is mounted on the pivot 103. The actuator arm 51 is held by ball bearings (not shown) arranged at the upper and lower portions of the pivot 103. The actuator arm 51 supports the suspension 52 and the head slider 10 at the distal end of the suspension 52. The voice coil motor 104, which is a type of a linear motor, is arranged at the proximal end of the actuator arm 51. The voice coil motor 104 is constituted by a driving coil (not shown) wound around the bobbin section of the actuator arm 51 and a magnetic circuit including a permanent magnet and a counter yoke sandwiching the driving coil. The actuator arm 51 can be slidably rotated using the voice coil motor 104. When the magnetic disc 101 rotates, the contact pad of the head slider 10 is held in contact with the surface of the magnetic disc 101. Thus, data can be recorded on or read out from the magnetic disc 101 with the magnetic head. The cover 105 is attached to the housing that accommodates these members.

What is claimed is:

1. A magnetic head structure comprising:
    (a) a magnetic head operable to at least one of (1) read from and (2) write onto a magnetic recording medium upon rotation of said magnetic recording medium relative to said magnetic head;
    (b) a support member supporting said magnetic head and having an air bearing surface positioned, when operating said magnetic head, adjacent said magnetic recording medium,
    (c) said support member including:
    (1) an air inlet region;
    (2) an air outlet region;
    (3) a first pad member; and
    (4) a second pad member;
    (d) said air bearing surface including:
    (5) first and second surfaces formed on outer surfaces of said first and second pad members respectively;
    (6) a third surface,
    (7) said first, second and third surfaces located in ascending order in a height direction from a level closest to the magnetic recording medium to a level furthest from the magnetic recording medium;
    (e) said first and second pad members, and said third surface forming:
    (8) a first positive pressure-generating region formed by positioning said first pad member at least partially overlying said second surface of said second pad member and positioning same substantially under a load point from a suspension;
    (9) a first negative pressure-generating region formed by the third surface positioned between the air inlet region and the first positive pressure-generating region;
    (10) a second negative pressure-generating region formed by the third surface positioned between the first positive pressure-generating region and the air outlet region;
    (f) said first positive pressure-generating region, said first negative pressure-generating region, and said second negative pressure-generating region forming a first positive pressure, a first negative pressure and a second negative pressure respectively upon positioning of said support member adjacent said magnetic recording medium and rotating said magnetic recording medium,
    wherein said first pad member includes a first part and a second part, and said second pad member includes a first part and a second part, and wherein the first positive pressure-generating region includes first and second central pads, said first central pad formed by overlying said first part of said first pad member on said first part of said second pad member, and said second central pad formed by overlying said second part of said first pad member on said second part of said second pad member, said first and second central pads arranged at opposite side central portions of said support member along the longitudinal direction thereof, to sandwich the third surface therebetween,
    and wherein said support member further includes first and second outlet side pads each having the second surface as outer surfaces thereof, said first and second outlet side pads formed on opposite sides of the support member along the widthwise direction thereof adjacent the air outlet region to sandwich the third surface therebetween.

2. The magnetic structure as recited in claim 1, wherein said support member includes a first bridge member having said second surface and connecting said first outlet side pad with said first part of said second pad member, and a second bridge member having said second surface and connecting said second outlet side pad with said second part of said second pad member.

3. The magnetic structure as recited in claim 2, wherein a width of each of the first and second bridge members is smaller than a width of any one of the second surfaces of the first and second central pads and first and second outlet side pads.

4. The magnetic structure as recited in claim 2, wherein outer ends of the first and second bridge members along the widthwise direction thereof are closer to a central longitudinal axis of said support member than outer ends of the second surfaces of the first and second central pads.

5. The magnetic structure as recited in claim 1, wherein the first negative pressure-generating region is arranged on a side air inlet edge of said air inlet region and includes the third surface located immediately after an inlet end pad having the second surface and formed separate from the first and second central pad members and the first and second outlet side pads.

6. The magnetic structure as recited in claim 1, wherein said magnetic head structure is a in-contact magnetic head slider in which said magnetic head contacts said magnetic recording medium during operation thereof.

7. A magnetic head assembly comprising the in-contact magnetic head slider as recited in claim 6.

8. A magnetic recording apparatus comprising:
a magnetic recording medium mounted rotatably; and
the magnetic head assembly as recited in claim 7 arranged to be movable in a radial direction of the magnetic recording medium.

9. A magnetic head structure comprising:
(a) a magnetic head operable to at least one of (1) read from and (2) write onto a magnetic recording medium upon rotation of said magnetic recording medium relative to said magnetic head;
(b) a support member supporting said magnetic head and having an air bearing surface positioned, when operating said magnetic head, adjacent said magnetic recording medium,
(c) said support member including:
(1) an air inlet region;
(2) an air outlet region;
(3) a first pad member having a first thickness and a first surface; and
(4) a second pad member having a second thickness and a second surface;
(5) a third surface supporting said first and second pad members;
(6) said first, second and third surfaces located in ascending order in a height direction from a level closest to the magnetic recording medium to a level furthest from the magnetic recording medium;
(7) said second pad member having a first central part, a first outlet side pad part and a first bridge part connected therebetween;
(8) said second pad member further having a second central part, a second outlet side pad part and a second bridge part connected therebetween;
(9) a first negative pressure-generating region formed on said third surface adjacent said air inlet region;
(10) a first positive pressure-generating region formed by positioning said first pad member at least partially overlying said second surface of said second pad member and positioning same substantially under a load point from a suspension; and
(11) a second negative pressure-generating region formed on said third surface between said first and second bridge parts and said first and second outlet side pad parts;
(12) said first positive pressure-generating region, said first negative pressure-generating region, and said second negative pressure-generating region forming a first positive pressure, a first negative pressure and a second negative pressure respectively upon positioning of said support member adjacent said magnetic recording medium and rotating said magnetic recording medium,
wherein said first pad member has a first part and a second part, said first part being positioned at least partially overlaying said first central part of said second pad member, and said second part being positioned at least partially overlaying said second central part of said second pad member,
and wherein a surface of said inlet pad member is not connected to said second surface of said second pad member.

10. The magnetic head structure as recited in claim 9, wherein a width of each of the first and second bridge parts is smaller than a width of any one of the second surfaces of the first and second central parts and first and second outlet side pad parts.

11. The magnetic head structure as recited in claim 9, wherein outer ends of the first and second bridge members along the widthwise direction thereof are closer to a central longitudinal axis of said support member than outer ends of the second surfaces of the first and second central pads.

12. The magnetic head structure as recited in claim 9, wherein outer ends of the first and second bridge parts along the widthwise direction thereof are closer to a central longitudinal axis of said support member than outer ends of the second surfaces of the first and second central parts.

13. The magnetic head structure as recited in claim 9, wherein said magnetic head structure is an in-contact magnetic head slider in which said magnetic head contacts said magnetic recording medium during operation thereof.

14. A magnetic head assembly comprising the in-contact magnetic head slider as recited in claim 13.

15. A magnetic recording apparatus comprising:
a magnetic recording medium mounted rotatably; and
the magnetic head assembly as recited in claim 14 arranged to be movable in a radial direction of the magnetic recording medium.

* * * * *